United States Patent
Wegener et al.

(10) Patent No.: US 6,948,757 B2
(45) Date of Patent: Sep. 27, 2005

(54) WIND SHIELD FOR MOTORBIKES AND DRIVE DEVICE FOR A VEHICLE COMPONENT

(75) Inventors: Fritz Wegener, Gilching (DE); August Hirschberger, Munich (DE); Peter Biecker, Oberhaching (DE); Sven Asendorf, Herrsching (DE)

(73) Assignee: HS Products Karosseriesysteme GmbH, Krailling (DE)

( * ) Notice: Subject to any disclaimer, the term of this patent is extended or adjusted under 35 U.S.C. 154(b) by 0 days.

(21) Appl. No.: 10/250,299

(22) PCT Filed: Dec. 28, 2001

(86) PCT No.: PCT/EP01/15368
§ 371 (c)(1),
(2), (4) Date: Dec. 30, 2003

(87) PCT Pub. No.: WO02/060747
PCT Pub. Date: Aug. 8, 2002

(65) Prior Publication Data
US 2004/0080175 A1 Apr. 29, 2004

(30) Foreign Application Priority Data
Dec. 29, 2000 (DE) .......................... 100 65 131

(51) Int. Cl.⁷ ............................................. B62J 17/00
(52) U.S. Cl. .................................................. 296/78.1
(58) Field of Search .............................. 296/78.1, 77.1, 296/84.1, 96.17, 97.8

(56) References Cited

U.S. PATENT DOCUMENTS

| | | | | |
|---|---|---|---|---|
| 4,606,571 A | * | 8/1986 | Fujita | 296/78.1 |
| 4,696,509 A | * | 9/1987 | Yagasaki et al. | 296/78.1 |
| 4,707,017 A | * | 11/1987 | Minobe et al. | 296/78.1 |
| 4,790,555 A | * | 12/1988 | Nobile | 296/78.1 |
| 4,830,423 A | * | 5/1989 | Nebu et al. | 296/78.1 |
| 5,704,679 A | * | 1/1998 | Sodo | 296/78.1 |
| 5,730,483 A | * | 3/1998 | Greger | 296/78.1 |
| 5,732,965 A | * | 3/1998 | Willey | 296/78.1 |
| 5,788,313 A | * | 8/1998 | Willey | 296/78.1 |
| 5,855,404 A | * | 1/1999 | Saunders | 296/78.1 |
| 5,857,727 A | * | 1/1999 | Vetter | 296/78.1 |
| 6,254,166 B1 | * | 7/2001 | Willey | 296/78.1 |
| 6,293,606 B1 | * | 9/2001 | Jarosz et al. | 296/78.1 |
| 6,543,831 B2 | * | 4/2003 | Takemura et al. | 296/78.1 |
| 6,789,835 B2 | * | 9/2004 | Wargin et al. | 296/78.1 |
| 2004/0061350 A1 | * | 4/2004 | Yoshida et al. | 296/78.1 |

FOREIGN PATENT DOCUMENTS

| | | | |
|---|---|---|---|
| DE | 39 41 875 A1 | | 6/1991 |
| DE | 3941875 | * | 6/1991 |
| DE | 10065130 | * | 7/2002 |
| JP | 2000-159172 | | 6/2000 |
| JP | 2000-177668 | | 6/2000 |
| JP | 2000177668 | * | 6/2000 |
| JP | 2000259172 | * | 6/2000 |
| JP | 2001334977 | * | 12/2001 |

* cited by examiner

Primary Examiner—Kiran B. Patel
(74) Attorney, Agent, or Firm—Nixon Peabody LLP; David S. Safran (57) ABSTRACT

A windshield for motorbikes which can be variably positioned at various angles of inclination on the motorbike by a holding device (6) and a drive device (8). The drive device (8) has a cable or a cable pull connection (22, 23, 24, 25) between a drive motor (26) of the drive device (8) and a support element (16) for the adjustable windshield. The holding device (6) can also be formed by two non-parallel guides (11, 19) for varying the position of the windshield (3) in terms of height and/or inclination, when it is moved along the guides (13, 19). The first guide (11) is fixed to the vehicle and the second guiding mechanism (19) is arranged on the windshield (3). A driveable carriage (12) which is connected to a support element (16) for the adjustable windshield and is situated on the first guide (11) engages a part (18) which is fixed to the vehicle and is situated on the second guide (19).

8 Claims, 13 Drawing Sheets

WIND SHIELD FOR MOTORBIKES AND DRIVE DEVICE FOR A VEHICLE COMPONENT

BACKGROUND OF THE INVENTION

1. Field of the Invention

The invention relates to a windshield for motorcycles which is adjustably mounted by a holding means on the motorcycle and can be adjusted by a drive means into different positions.

The invention furthermore relates to a windshield for motorcycles which is adjustably mounted by a holding means on the motorcycle, the holding means having two non-parallel guides for setting different vertical and/or inclined positions of the windshield as it moves along the guides.

Finally, the invention relates to a drive means for an adjustably supported motor vehicle component, especially a windshield for motorcycles.

2. Description of Related Art

German Patent DE 39 41 875 C1 discloses a windshield which is mounted on a motorcycle so as to be adjustable in its height and its angular orientation by an adjustment means. The adjustment means contains at least two guide rails arranged at different angles and on each of which a respective sliding piece is movably supported. The windshield is connected to the two sliding pieces to be able to pivot around the transverse axis of the vehicle. An electric motor is located in the area of the front, lower guide rail and via a threaded rod transfers linear drive motion to the sliding piece which is supported on the front guide rail. The driving of the sliding piece via the threaded rod or a comparable dimensionally stable drive element limits the possible locations of the electric motor in the vicinity of the front guide rail.

SUMMARY OF THE INVENTION

A primary object of the present invention is to provide a windshield of the initially mentioned type with a drive device which is improved with respect to its arrangement and functionality.

Another object of the invention is to provide a windshield of the initially mentioned type with a holding means with two guides which is adjustably supported by a durable holding means with a simple structure.

A further object of the invention is to provide a drive means of simple structure for an adjustable vehicle component.

The initially mentioned object is achieved in accordance with the invention in that the drive means for the windshield has a cable line connection between the drive motor of the drive means and the adjustable windshield. A cable line connection which is formed, for example, in the manner of a Bowden cable, can be installed flexibly with bends or curvatures so that the drive means can be attached in the vicinity of the windshield or also farther away from it on the motorcycle without major structural limitations which entail rigid connecting elements, such as spindles or the like.

The initially mentioned object is also achieved in the initially mentioned windshield in accordance with the invention in that the drive means for the windshield has a lever means with at least one pivotally mounted drive lever between the drive motor of the drive means and the adjustable windshield. Rigid coupling by means of a pivotable drive lever enables reliable, play-free actuation and adjustment of the windshield. The lever ratios on the drive lever can be designed such that none of the drive movements applied to the drive lever are stepped up into large driven motions of the drive lever. This yields a compact execution of the drive unit.

If the drive means for the windshield has a lever means with two symmetrically arranged drive levers which are each connected on the outside end to a carriage, which is supported in the middle for pivoting in opposite directions, and which on the inner end are connected to one another by means of a movable coupling part, a uniform drive motion can be applied to two movable bearing parts of the windshield which are spaced apart from one another.

The second object is achieved by the first guide is mounted on the vehicle and the second guide being located on the windshield and by a driven carriage which is connected to the windshield on the first guide which is mounted on the vehicle and a vehicle-mounted part on the second guide located on the windshield being drive-engaged. Thus, both the vehicle-mounted part and also the windshield or the part connected to the windshield assume a guide function. Functionally, the carriage is connected via a cable line connection to the drive means. Here, the aforementioned advantages of the flexible arrangement of the drive means apply. A cable line connection is defined as any connections which are resistant to extension and compression, but which are flexible, and which can be flexible installed on the motorcycle, for example, in the manner of a Bowden cable.

Preferably, the windshield is mounted on the windshield bearing part which contains the second guide and which is connected to the carriage. In this configuration, the windshield bearing part forms a unit of the holding means and the windshield is interchangeably attached to the windshield bearing part and the holding means without effort.

If each cable line is guided to a respective one of a right-side and a left-side windshield bearing part or on two spaced mounting points on the windshield itself by the drive means, reliable adjustment of the windshield is ensured by this double driving.

Functionally, the drive means contains a rope pulley on which the cable or the rope of at least one cable or rope line can be wound and unwound. This pulley can have two adjacent peripheral grooves on which two cable lines can be wound and unwound at the same time and in the same direction so that the two cables, and thus the two windshield bearing parts, are synchronously activated. By means of one of the two cable line connections, at least one other movable part of the motorcycle can be adjusted synchronously to the motion of the windshield.

In one preferred embodiment, the guides are made as links in which stationary bearing elements, such as pins or the like, are guide-engaged. If the guides or links are formed to be linear, depending on the mutual assignment, a uniform adjustment motion is enabled. When the guides or links have at least one curved section, a pivoting motion of the windshield can be superimposed on the linear adjustment motion. Instead of the curved section, any shape of the guide or the link deviating from the linear section can make provide a pivoting motion of the windshield which deviates from the straight adjustment motion.

Preferably, the first guide or link is made in at least one longitudinal part of the holding means. This longitudinal part can be a central part of the holding means. Alternatively, there are two longitudinal parts in the right-side and left-side arrangement for the two windshield bearing parts.

Preferably, the longitudinal part is formed from at least two combined components which can be divided along the guide. This configuration facilitates the production of guides and the installation of the assigned components of the holding means, such as, for example, the carriage.

In the drive means for an adjustably supported vehicle component, especially a windshield for motorcycles, it is provided in accordance with the invention that the drive means has a cable line connection between the drive motor of the drive means and the vehicle component and a rope pulley on which at least one cable line can be wound and unwound and is guided by the drive means to the vehicle component or to a right-side and to a left-side vehicle component bearing part.

Furthermore, it is provided that the drive means has a lever means with at least one pivotally supported drive lever between the drive motor of the drive means and the adjustable vehicle component.

Further details of the configuration and advantages of the invention will become apparent from the following description taken together with the accompanying drawings.

DETAILED DESCRIPTION OF THE INVENTION

Figure 1:
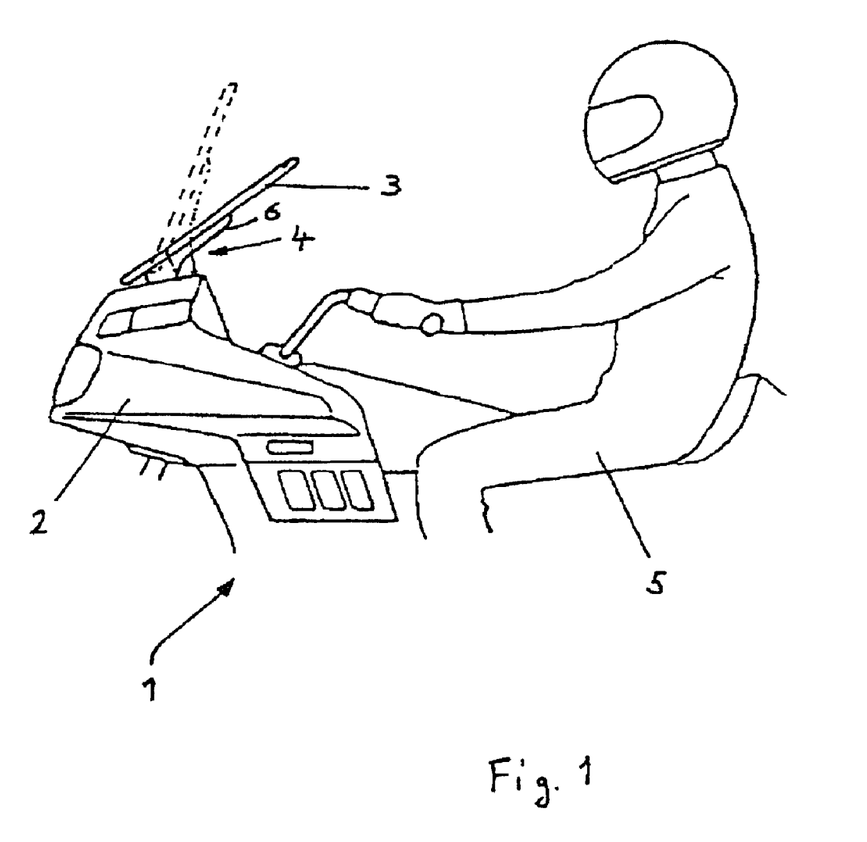
FIG. 1 is a side view the front part of a motorcycle with an adjustable windshield.
Figure 2:
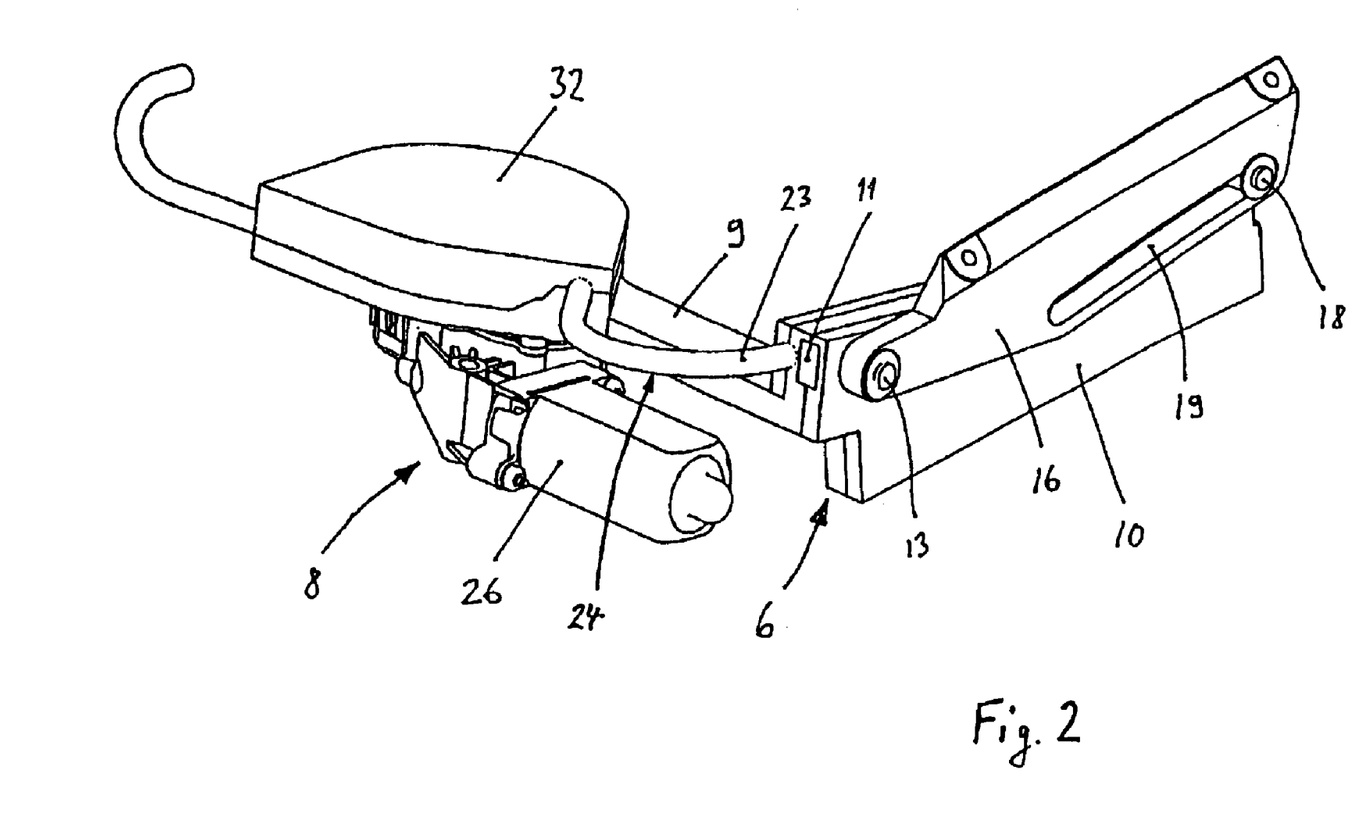
FIG. 2 is a perspective view of the holding means of the windshield with a drive device in the initial position.
Figure 3:
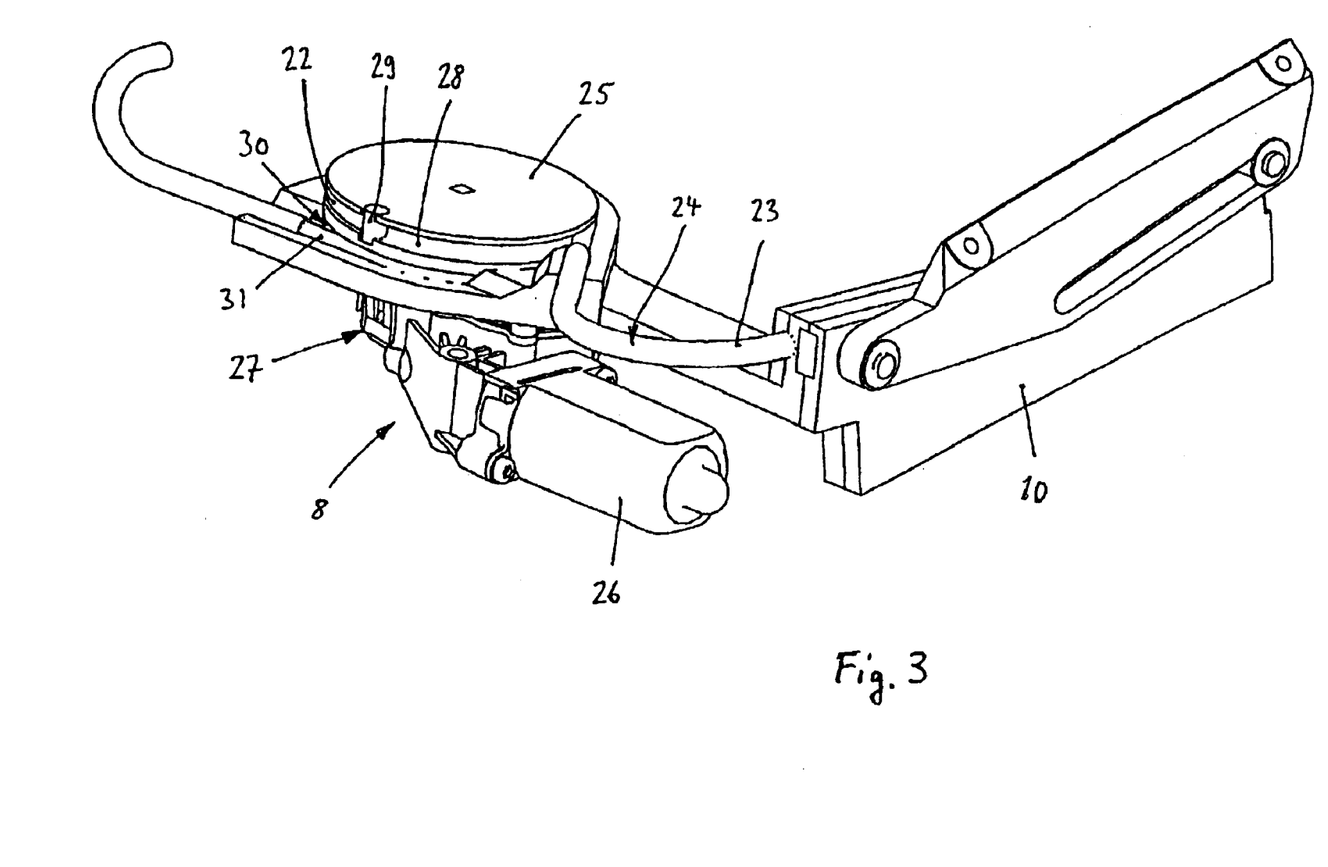
FIG. 3 is a view similar to that of FIG. 2 showing the drive device with the covering removed.

The partially depicted motorcycle 1 of FIG. 1 has a cowling 2 and a windshield 3 which is mounted above the cowling 2 by a holding means 4 such that it can route the slipstream past the motorcycle driver 5. If necessary, the windshield 3 can be adjusted in its height and/or its angle of inclination by the holding means 4 out of a most vertical set position (shown schematically in FIG. 1 in broken lines) into a highly inclined position (shown in solid lines).

The holding means 4 contains a holding frame 6 (only the part of the left part of which is shown in FIGS. 2 to 7) with mounting or screw openings 7 (see, FIGS. 5 & 8) for fixing the holding frame 6 on the frame of the motorcycle 1 or on the cowling 2. A drive means 8 is mounted on the central transverse part 9 of the holding frame 6. On the longitudinal side parts 10 (only the left longitudinal part 10 being shown), a linear link guide 11 (see, FIG. 4) with a, for example, rectangle cross section is formed in which an elongated carriage 12 is movably held. A front bearing pin 13 extends through a side oblong hole opening 14 of the link guide 11 into the bearing hole 15 of a windshield bearing part 16. The carriage 12 is drive-engaged with a part, e.g., a stationary rear bearing pin 18 that projects on the back end 17 of the longitudinal part 10, laterally to the outside, and fits into the link guide 19 of the windshield bearing part 16 which is formed as an oblong hole. The guides 11, 19 are non-parallel with respect to each other, as is apparent from the drawings, for varying the position of the windshield 3 in terms of height and/or inclination, when it is moved along the guides. The rear bearing pin 18 is located above the link guide 11, and the link guide 19 of the windshield bearing part 16 runs underneath the front bearing pin so that the windshield bearing part 16 is swung up around the bearing pin 13 if it is pushed lengthwise by means of the driven carriage 12 and the bearing pin 13. The windshield bearing part 16 has mounting openings 20 for attaching the windshield 3.

Next to the link guide 11 and parallel to it, a channel 21 is formed, which connects with the opening 14 of the link guide 11 (see FIGS. 5 to 7) and in which a drive cable 22, which is connected to the carriage 12, is movably held. The drive cable 22 is movably guided in jacketing 23 from the windshield bearing part 16, via a bend 24, to the pulley 25 of the central drive means 8. The pulley 25 is mounted on the gear shaft of the force transmission mechanism 27 driven by the electric motor 26 (see especially FIG. 3), and has a peripheral groove 28 in which the drive cable 22 can be wound and unwound and which is resistant to tension and compression. By means of retaining pin 29 which is mounted on the end of the drive cable 22 and which is inserted in a recess of the rope pulley 25, the drive cable 22 is attached to the pulley 25 in the peripheral direction, resistant to extension. The pulley 25 has a second peripheral groove 30 next to the first peripheral groove 28 in which, in the same direction of rotation, a second drive cable 31 for the opposing, right-side windshield bearing part (not shown) is located. The covering 32 (see FIG. 2) covers and seals the pulley 25.

Figure 4:
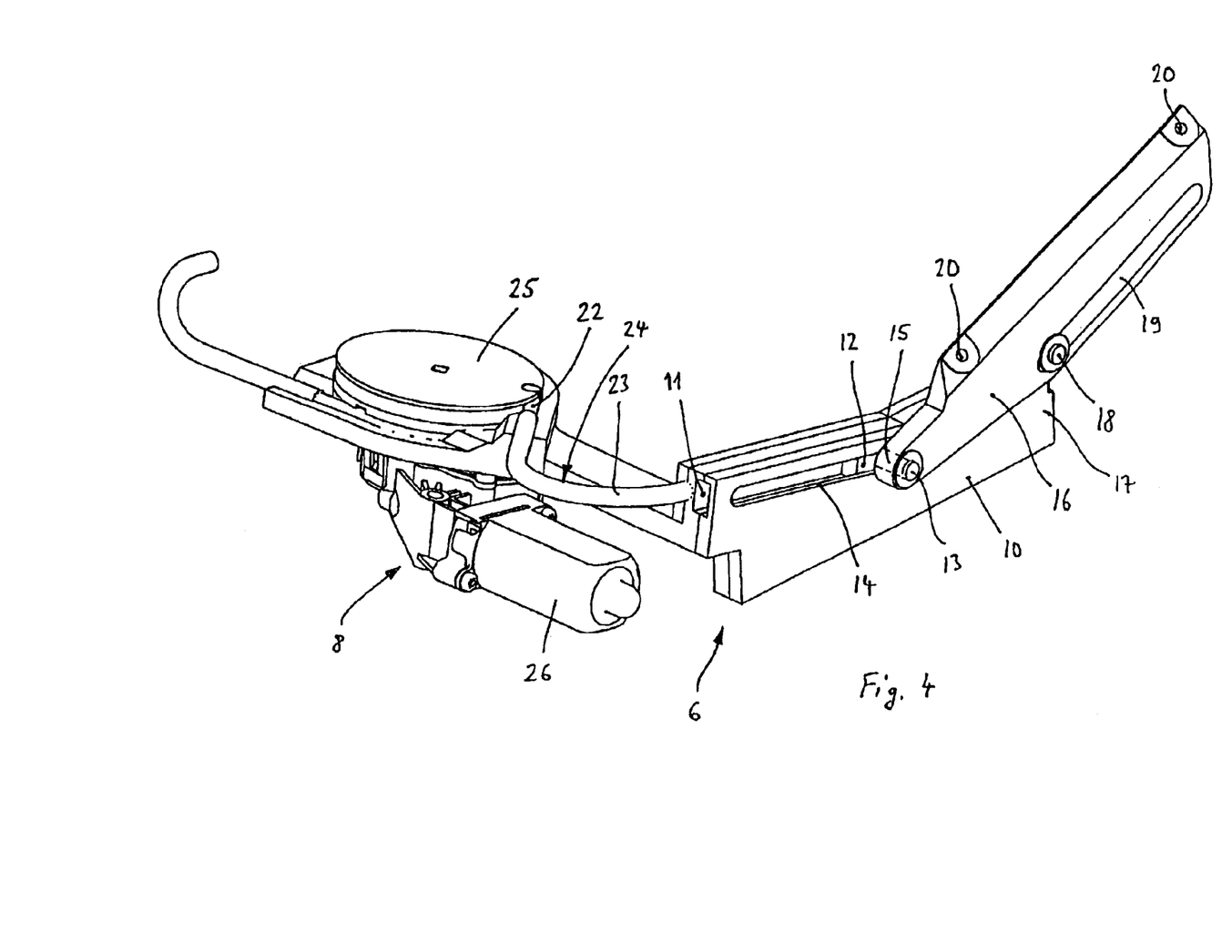
FIG. 4 is a view similar to that of FIGS. 2 & 3 showing the holding and drive device in the end position.
Figure 5:
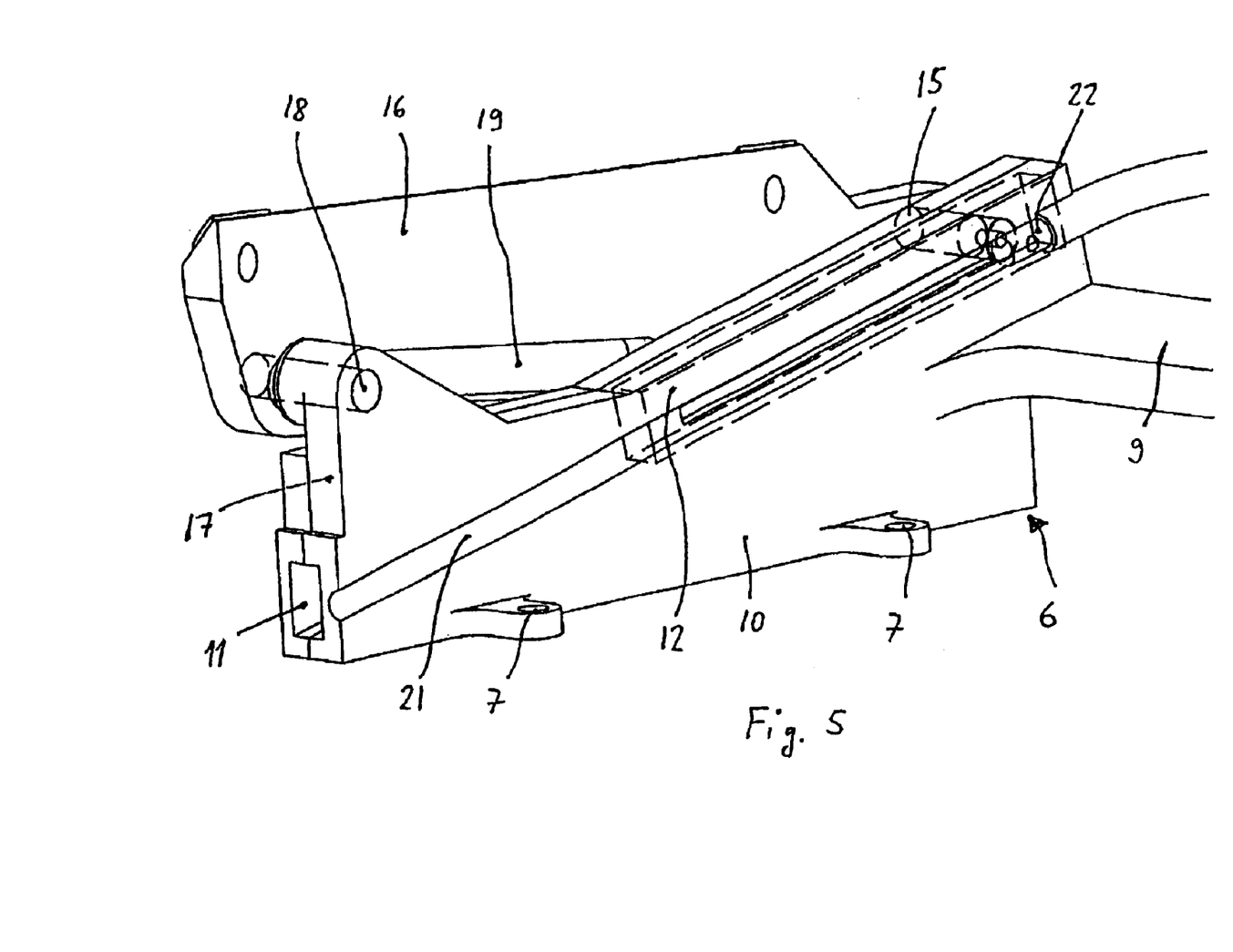
FIG. 5 is a perspective view of an inner side of the left-side part of the holding means.
Figure 6:
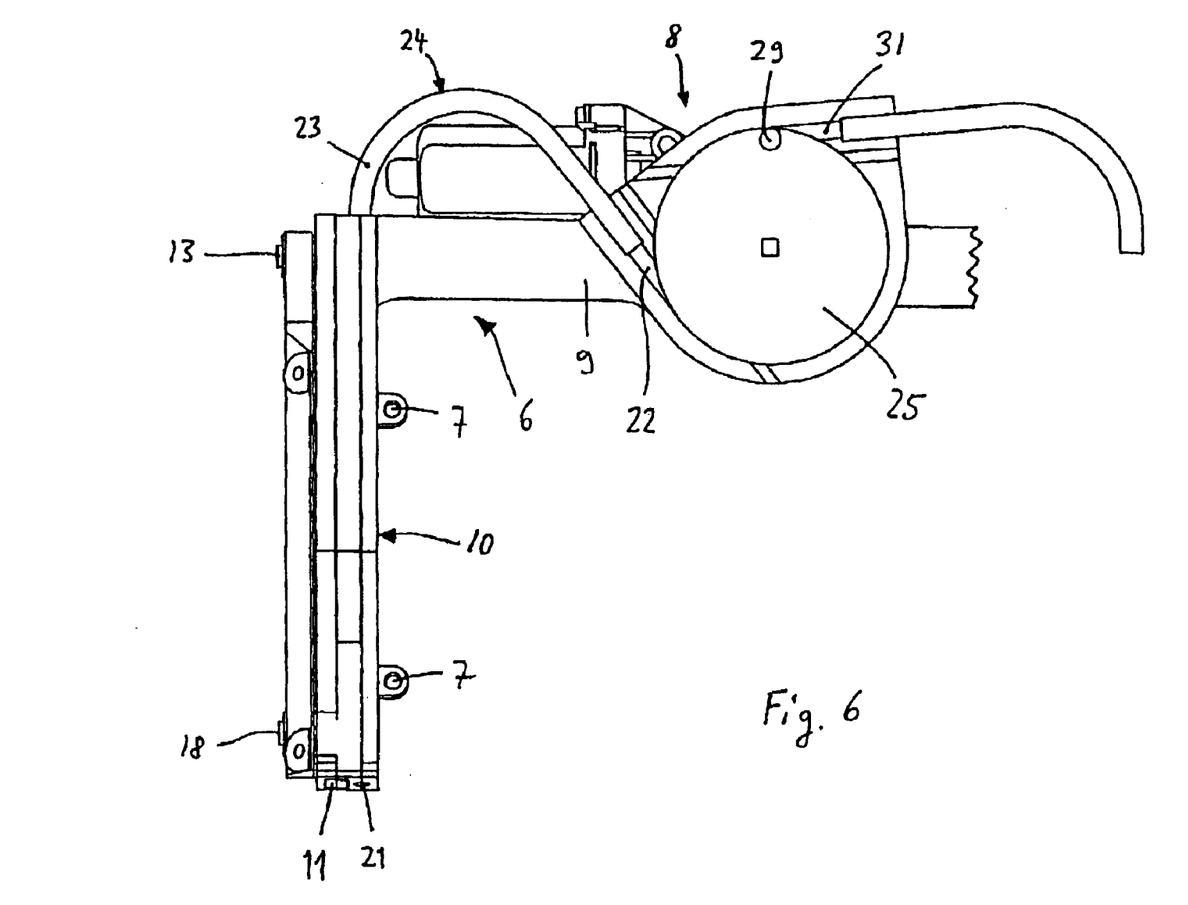
FIG. 6 is a top view of the left-side part of the holding means and the drive device.
Figure 7:
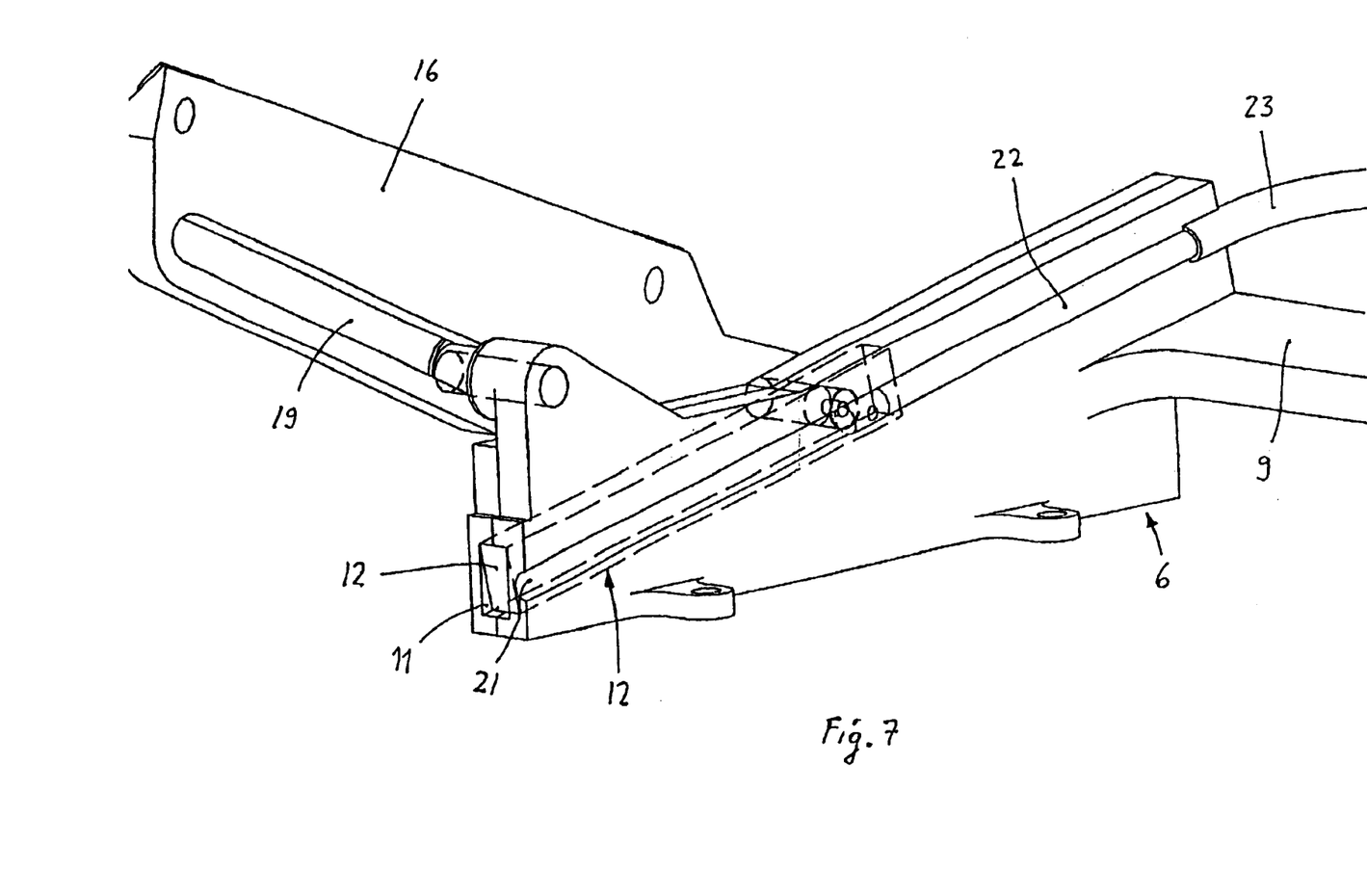
FIG. 7 shows in an inside view as shown in FIG. 5, but with the holding means in the end position as shown in FIG. 4.
Figure 8:
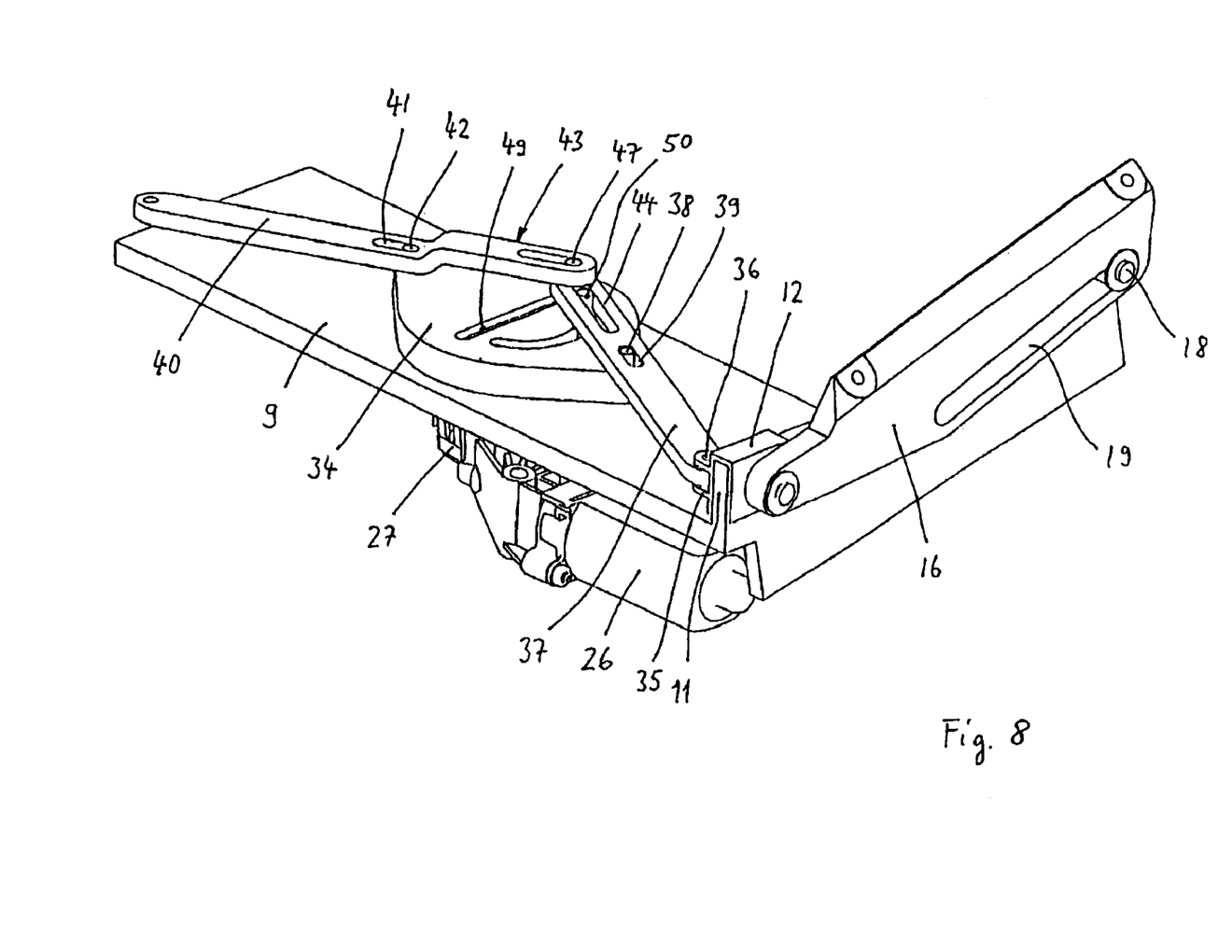
FIG. 8 is a perspective view from above of a second embodiment of a holding means of the windshield with a modified drive device in the initial position.
Figure 9:
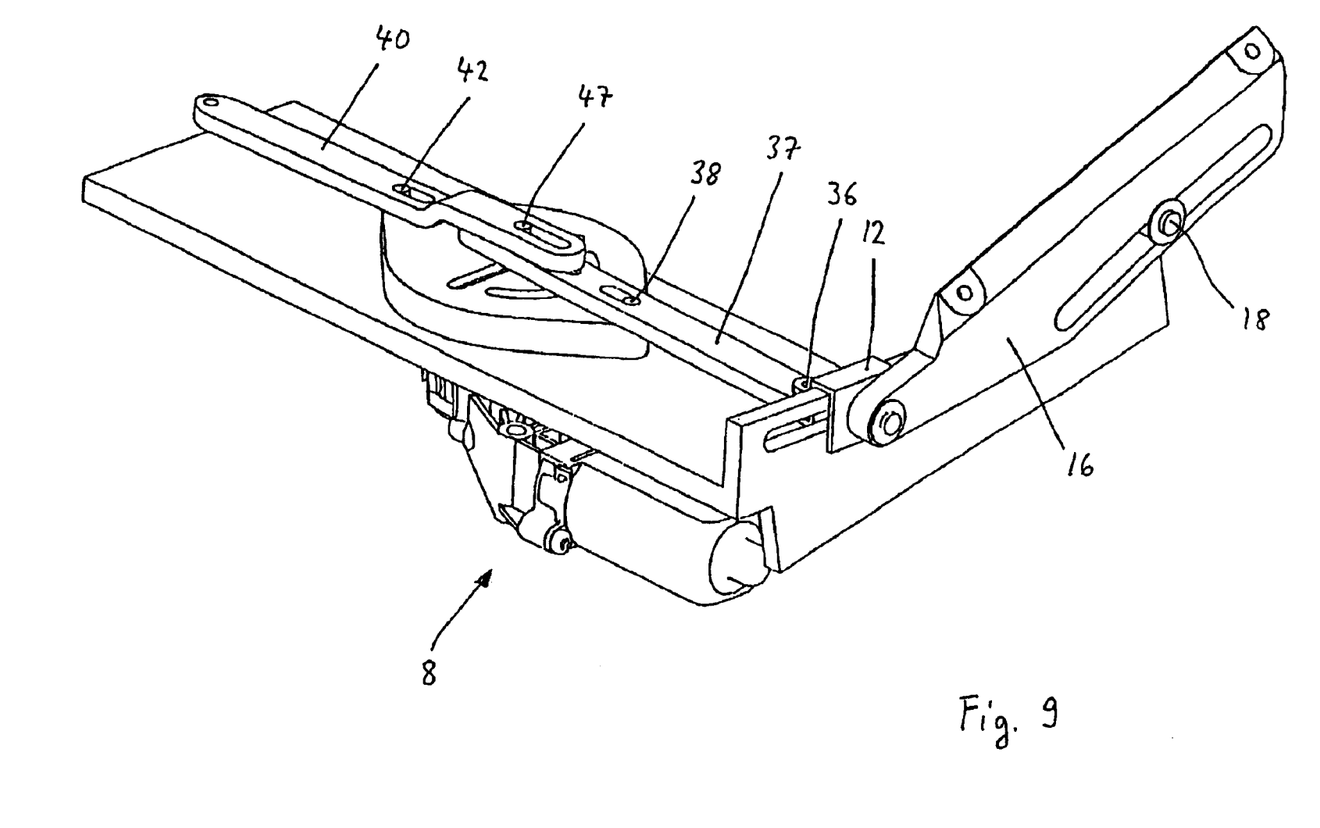
FIG. 9 is a view corresponding to that of FIG. 8, but with the holding and drive device in the intermediate position.

When the electric motor 26 is actuated, for example, via a hand switch on the handlebars or via a speed-dependent or slipstream-dependent control, the drives cables 22, 31 are taken up at the same time from the position shown in FIG. 1 in which the two windshield bearing parts 16 are located in the front position and hold the windshield 3 in the lower vertical position with a slight upward inclination, via rotation of the cable pulley 25 so that, via rearward displacement of the respective carriage 12, the windshield bearing parts 16, and thus the windshield 3, are raised and inclined more dramatically against the slipstream. The end position is shown in FIGS. 4 & 7.

The opposing drive motion of the electric motor 26 moves the windshield 3 back again into the reclined position or into an intermediate position.

If the link guide 11 is positioned so that it rises over its length relative to the lengthwise axis of the motorcycle, the front bearing pin 13, and thus the windshield bearing part 16 and the windshield 3, are additionally raised in its vertical position.

One or both link guides 11, 19 can have angled or curved sections so that a certain swinging behavior of the windshield 3 which is dependent on the lengthwise displacement can be fixed.

The largely flexibly installable drive cables 22, 31 of the drive means 8 enable a comparatively free arrangement of the drive means 8 relative to the movable holding means 4 or to the windshield 3 so that the electric motor 26 with the transmission 27 and the pulley 25 can also be located away from the holding means 4 and at angular positions to it, which is something which could be accomplished by a conventional mechanical coupling only with high construction cost.

The pulley 25 can guide two synchronously drivable drive cables to two separate windshield bearing parts 16 which are spaced apart, and different distances from the pulley 25 to each of the windshield bearing parts 16 can be easily bridged.

In another embodiment of the windshield (see, FIGS. 8 to 13), with a modified drive means, the holding means 4 contains a drive pulley 33 (see FIG. 11) which is located on the central transverse part 9 in the middle between the two side longitudinal parts 10 (only the left longitudinal part 10 is shown) and is pivotally supported on it and is coupled to rotate with the electric motor 26 via the transmission mechanism 27. The drive wheel 33 is covered by a cover 34 which is mounted on the transverse part 9. The carriage 12 of the windshield bearing part 16 is U-shaped and sits movably on the guide 11 which is formed sa a rail. On the two brackets 35, which project inward from the carriage 12, a pin 36 is mounted on which a left drive lever 37 is pivotally supported. The drive lever 37 extends roughly to the middle of the transverse part 9, resting directly on the cover 34, and supported to move and pivot on a pin 38 which projects upward, for example, from the cover 34 and which is held to be able to move into an elongated hole 39 in the drive lever 37.

Figure 11:
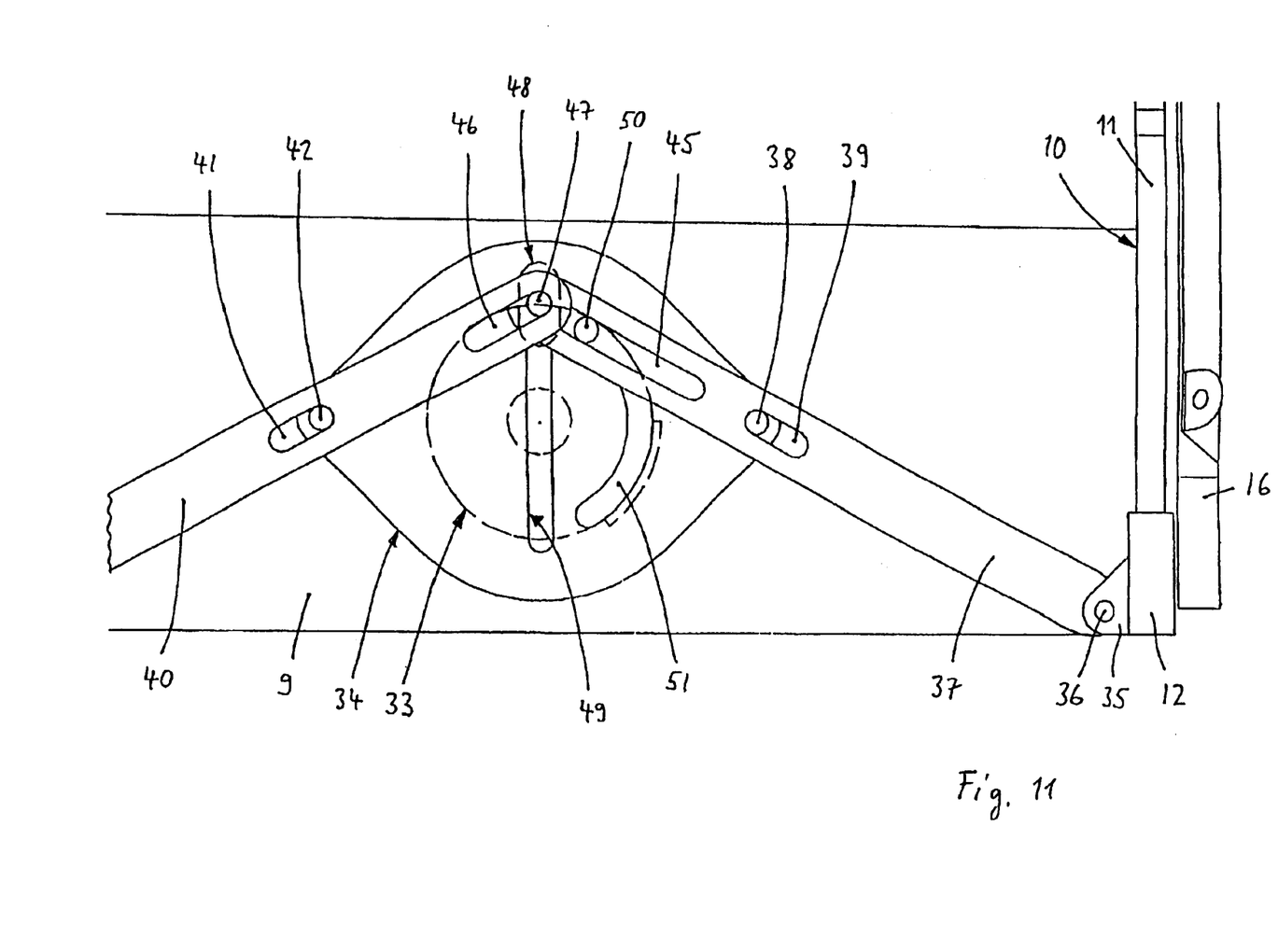
FIG. 11 is a plan view of the holding means of the second embodiment in the initial position according to FIG. 8.
Figure 12:
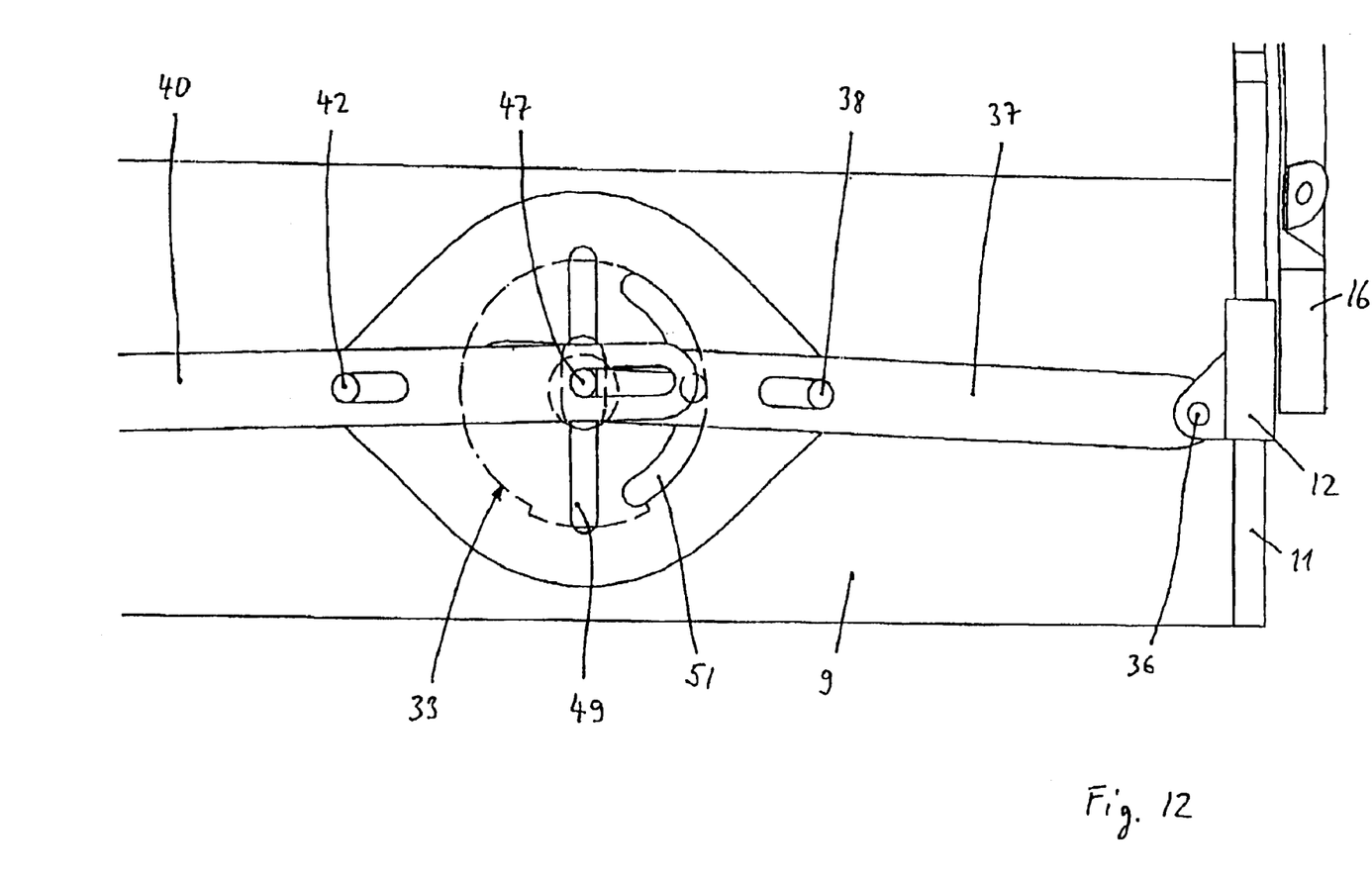
FIG. 12 is a plan view of the holding means in the intermediate position according to FIG. 9.
Figure 13:
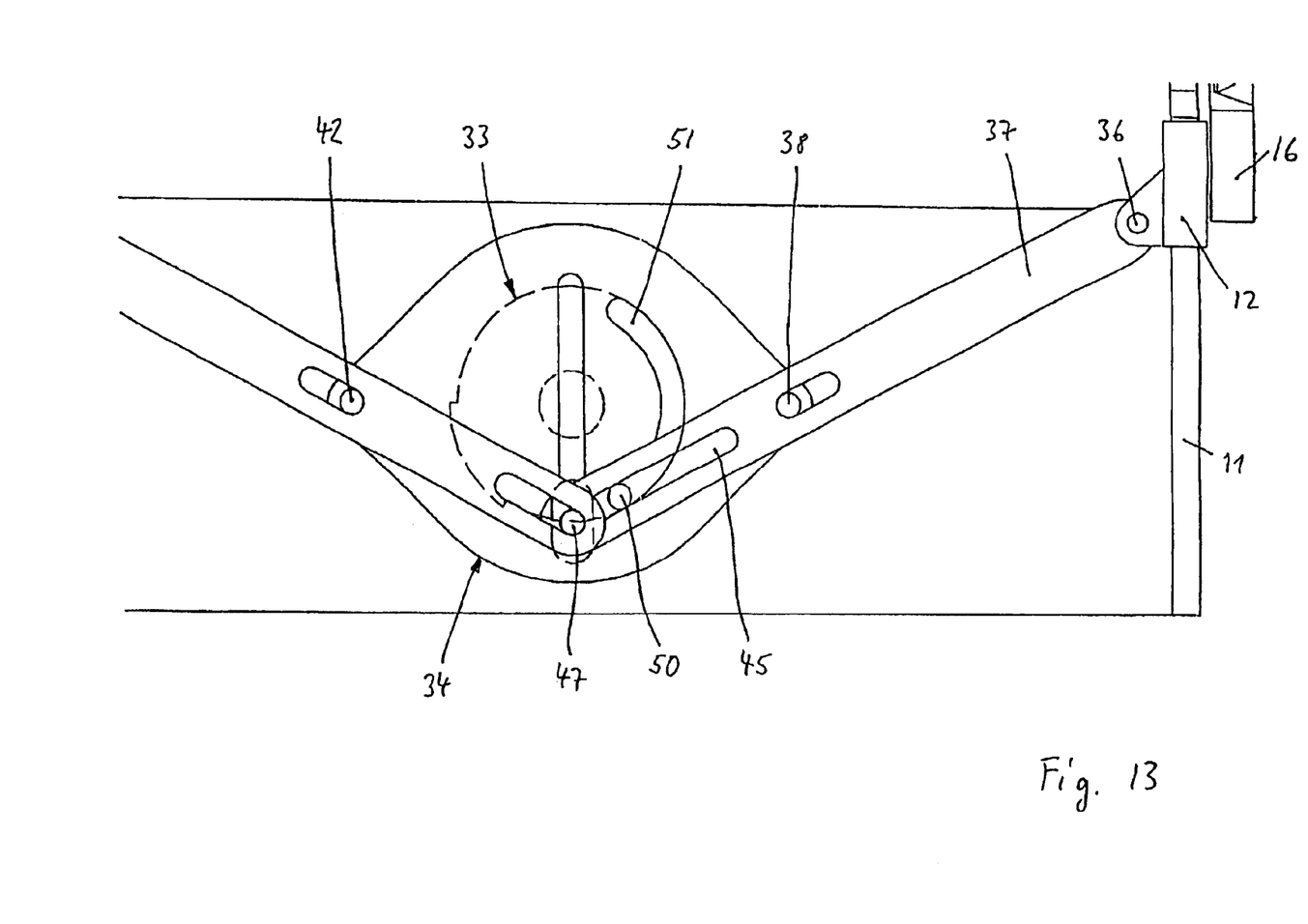
FIG. 13 is a plan view of the holding means in the end position according to FIG. 10.

A right drive lever 40 for driving the right windshield bearing part or its carriage is located symmetrically to the left drive lever 37 and is supported in the corresponding manner by means of a pin 42 which fits into the longitudinal slot 41. The right drive lever 40 has an inner end 43 which is bent up such that this end 43 rests on the inner end 44 of the left drive lever 37. The inner ends 43, 44 of two drive levers 37, 40, each contain a longitudinal guide slot 45, 46 in which is held a movable coupling part, e.g., the guide pin 47 which is mounted on a sliding piece 48 which is movably supported in a longitudinal guide 49 on the cover 34. A drive part, e.g., a guide pin 50 which is eccentrically mounted on the drive wheel 33 extends through an arc-shaped slot 51 in the cover 34 (which defines a circular path) up into the longitudinal guide slot 45 in the drive lever 37 (as shown) or into the lengthwise hole 46 of the right drive lever 40.

Figure 10:
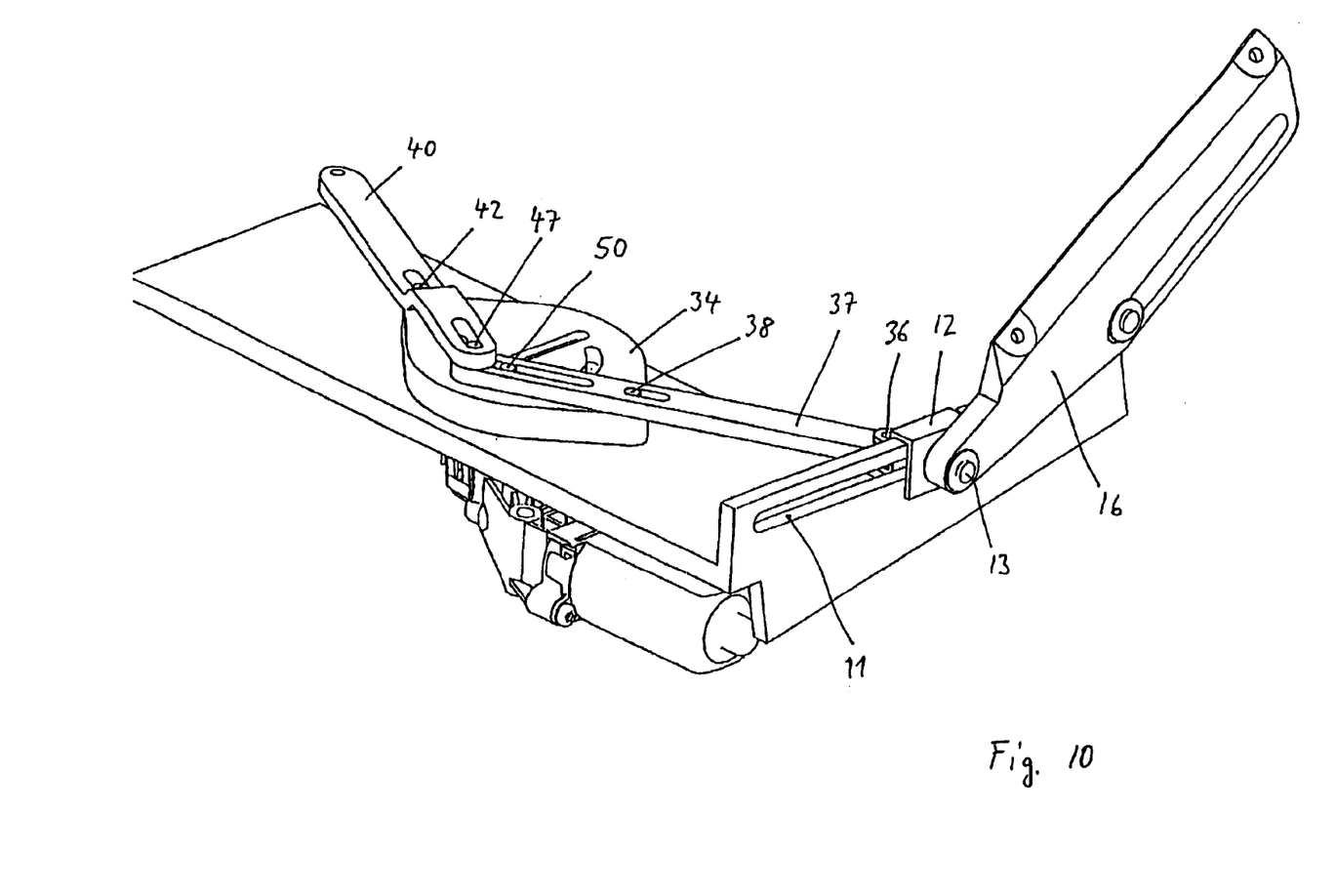
FIG. 10 is a view corresponding to that of FIG. 8, but with the holding and drive device in the end position.

To change the position of the windshield 3, the drive means 8 causes the drive wheel 33 to rotate and swings the windshield 3, for example, by an angle of a maximum roughly 130° clockwise as shown in FIGS. 8 to 13. In doing so, the pin 50, which slides in the longitudinal guide slot 45, pivots the left drive lever 37 around the pin 38 so that the drive lever 37 moves the carriage 12, and thus, the left windshield bearing part 16 to the rear via the middle intermediate position shown in FIGS. 9 & 12 into the end position which is shown in FIGS. 10 & 13 and in which the windshield 3 is raised to have a greater inclination.

As a result of the pin 50 which couples the two drive levers 37, 40 to one another, the drive motion is transferred to the two drive levers 37, 40 for their synchronous movement.

This embodiment has a small installation depth of the drive, since the drive motion takes place via the drive lever which pivots through only a comparatively small angle. The rotary motion of the pin 50 in the vicinity of the two end positions causes only minor pivoting of the two drive levers 37, 40, so that starting and braking take place gently in the vicinity of the two end positions.

The drive means 8 is controlled via Hall sensors in the drive motor and/or via microswitches which are triggered via the drive wheel 33. There can also be a comparable control in the first embodiment.

What is claimed is:

1. Windshield arrangement for motorcycles comprising:
   a windshield,
   a holding means for adjustably mounting the windshield on a motorcycle, and
   a drive means for moving the holding means and the windshield supported thereby into different positions,
   wherein the drive means comprises a drive motor and a lever means for transmitting a motive force from the drive motor to the holding means;
   wherein said lever means comprises two symmetrically arranged drive levers connected between the drive motor and the holding means;
   wherein the drive means for the windshield has a lever means with two symmetrically arranged drive levers; and
   wherein each of the two drive levers is connected at an outer end to a respective movably guided carriage which is coupled to the windshield, the drive levers being supported in the middle for pivoting in opposite directions, and being connected to one another by means of a movable coupling part at an inner end.

2. Windshield arrangement for motorcycles according to claim 1, wherein said force transmission mechanism comprises a drive cable connected between the drive motor and the holding means.

3. Windshield arrangement as claimed in claim 1 wherein the drive lever is drivable via the drive motor to pivot around a pivot axis which is located between opposite ends of the drive lever.

4. Windshield arrangement as claimed in claim 3, wherein the holding means has two nonparallel guides at each of opposite lateral sides of the windshield arrangement for setting positions which differ in at least one of vertical height and angle of inclination of the windshield as the windshield moves along the guides, a first of the guides being mountable on the vehicle and a second of the guides being connected to the windshield, and wherein a driven carriage connected to the windshield is located on the first of the guides and is drive-engaged with a part on the second of the guides.

5. Windshield arrangement as claimed in claim 1, wherein the drive lever is drive-engaged to a drive path which is guided on a circular path, which is driven by the drive motor and which is guided to be able to move lengthwise on the drive lever.

6. Windshield arrangement as claimed in claim 5, wherein the drive part is a pin which is arranged eccentrically relative to a drive wheel.

7. Windshield arrangement as claimed in claim 1, wherein the movable coupling part is a guide pin which fits into a longitudinal guide of the drive levers.

8. Windshield arrangement for motorcycles, comprising:
   a windshield,
   a holding means for adjustably mounting the windshield on a motorcycle, and a drive means for moving the holding means and the windshield supported thereby into different positions, wherein the drive means comprises a drive motor and a force transmission mechanism for transmitting a motive force from the drive motor to the holding means;

wherein the holding means has two non-parallel guides at each of opposite lateral sides of the windshield arrangement for setting positions which differ in at least one of vertical height and angle of inclination of the windshield as the windshield moves along the guides, a first of the guides being mountable on the motorcycle and a second of the guides being connected to the windshield, and wherein a driven carriage connected to the windshield is located on the first of the guides and is drive-engaged with a part on the second of the guides.

* * * * *